Aug. 4, 1931.  L. L. BARR  1,817,798

PIPE SUPPORT

Filed Dec. 12, 1929

INVENTOR.
L. L. BARR,
BY
ATTORNEY.

Patented Aug. 4, 1931

1,817,798

UNITED STATES PATENT OFFICE

LOUIS L. BARR, OF GREENVILLE, SOUTH CAROLINA, ASSIGNOR TO L. L. BARR CO., OF GREENVILLE, SOUTH CAROLINA, A PARTNERSHIP COMPOSED OF LOUIS L. BARR, JAMES M. RUSSELL, AND JULIUS M. BARR

PIPE SUPPORT

Application filed December 12, 1929. Serial No. 413,634.

My invention relates to supports for pipes employed for conveying steam or the like, and arranged in underground conduits.

In accordance with my invention, I provide pipe supports which are adapted to be held securely between the interfitting adjacent ends of conduit sections. The supports are so constructed that they may be assembled with standard conduit sections, without changing the construction of the same or necessitating them being made with special or additional parts.

Figure 1:
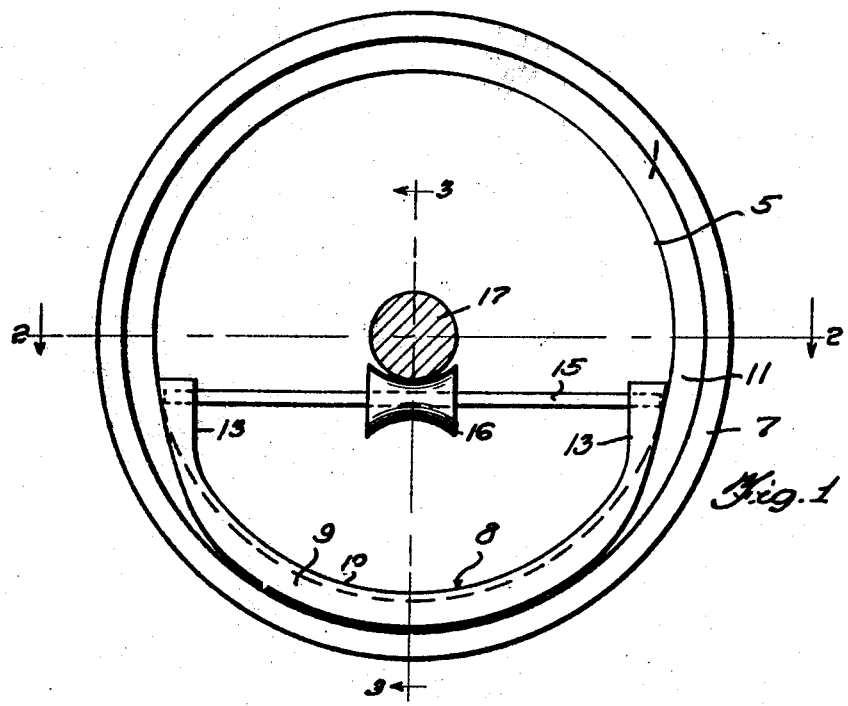
Figure 2:
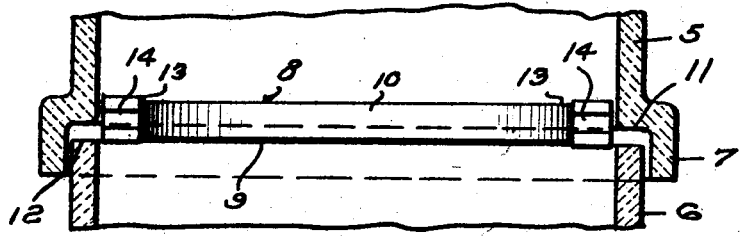
Figure 3:
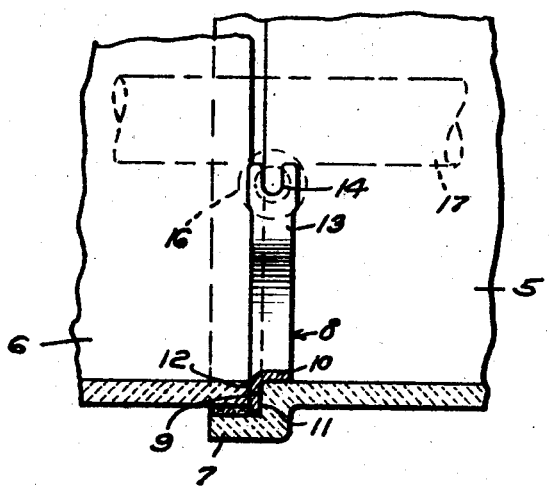

In the accompanying drawings, forming a part of this specification, and in which like numerals are employed to designate like parts throughout the same, Figure 1 is a side elevation of a support embodying my invention, Figure 2 is a horizontal section taken on line 2—2 of Figure 1, and, Figure 3 is a transverse section through the support, taken on line 3—3 of Figure 1.

In the drawings, wherein for the purpose of illustration, is shown a preferred embodiment of my invention, the numerals 5 and 6 designate conduit sections, such as pipe sections formed of cast iron, terra-cotta, or the like. Each conduit section is provided at one end with a bell 7 to receive the adjacent end of the next conduit section 6.

My pipe support embodies a generally U-shaped supporting member 8, having a curvature throughout the major portion of its length, corresponding to the curvature of the conduit within which it is mounted. This supporting member is L-shaped in cross section, affording a vertical flange 9 and a horizontal flange 10. The horizontal flange is adapted to rest upon the inner wall of the conduit section while the vertical flange is adapted to be clamped between the adjacent end of a wall 11 of the bell 7 and the end wall 12 of the adjacent conduit section, whereby the supporting member is securely held in place and can not tile or become displaced. At its ends, the U-shaped supporting member projects inwardly, affording arms 13, having vertical slots 14, in their ends, for receiving a horizontal rod or pin 15, carrying a grooved roller 16, to support a steam pipe 17, or the like.

In view of the foregoing description, it is obvious that the supporting member 8 is placed in position within the bell 7, when the end of the adjacent conduit is being assembled with the bell 7. The supporting member is thus securely held in place and carries the rod 15 and associated elements. The vertical and horizontal flanges 9 and 10 extend throughout the minor portion of the length of the supporting member. The vertical flange engages between the adjacent ends of the conduit sections, and due to the length of this vertical flange, such flange is rigidly clamped between the same. By virtue of the supporting member being L-shaped in cross-section, vertical and horizontal flanges are afforded, and since the openings or slots 14 are formed in the horizontal flange, these slots are offset with respect to the adjacent ends of the conduit sections, so that the rod 15 will contact with the side wall of the conduit, when shifted longitudinally, and will be limited in such movement. This prevents the ends of the rod from entering the space between the adjacent ends of the conduit sections. The device is adapted to be used in connection with standard conduit sections, and may be made in various sizes to properly fit the same. The use of the device requires no change in the construction of the conduit sections.

It is to be understood that the form of my invention, herewith shown and described, is to be taken as a preferred example of the same, and that various changes in the shape, size and arrangement of parts, may be resorted to, without departing from the spirit of my invention, or the scope of the subjoined claims.

Having thus described my invention, I claim:—

1. A device for supporting pipes or the like in underground conduits comprising a generally U-shaped supporting member which is substantially L-shaped in cross section to afford horizontal and vertical flanges extending throughout substantially its entire length, the vertical flange being adapted to engage between the ends of adjacent conduit sections and the horizontal flange being adapted to engage the inner wall of one conduit section and offset laterally from the meeting ends of the conduit sections, said horizontal flange having generally vertical slots formed in its upper ends, a rod inserted within said slots and held thereby so that its ends are offset laterally from the meeting ends of the conduits and a roller carried by the rod.

2. A device for supporting pipes or the like in underground conduits comprising a generally U-shaped supporting member having horizontal and vertical flanges extending throughout the major portion of its length, the vertical flange being adapted to engage between the ends of adjacent conduit sections and the horizontal flange being adapted to engage the inner wall of one conduit section and offset laterally from the meeting ends of the conduit sections, said horizontal flange having openings formed in its ends, a rod inserted within the openings and held thereby so that its ends are offset laterally from the meeting ends of the conduits, and a roller carried by the rod.

In testimony whereof I affix my signature.

LOUIS L. BARR.